UNITED STATES PATENT OFFICE.

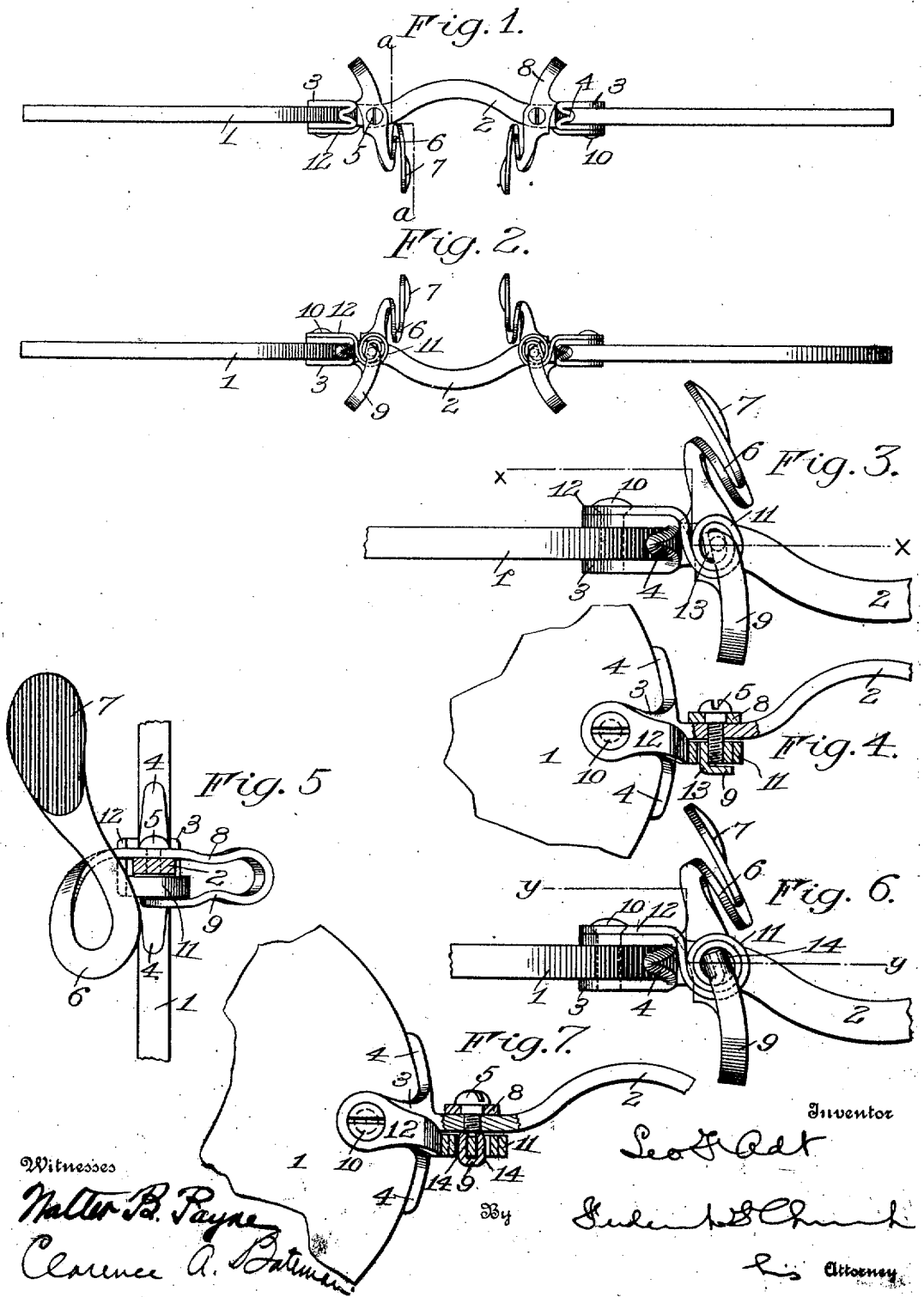

LEO F. ADT, OF ALBANY, NEW YORK.

EYEGLASS-MOUNTING.

1,019,115.  Specification of Letters Patent.  Patented Mar. 5, 1912.

Application filed February 17, 1906. Serial No. 301,562.

*To all whom it may concern:*

Be it known that I, LEO F. ADT, of Albany, in the county of Albany and State of New York, have invented certain new and useful Improvements in Eyeglass - Mountings; and I do hereby declare the following to be a full, clear, and exact description of the same, reference being had to the accompanying drawings, forming a part of this specification, and to the reference-numerals marked thereon.

My present invention relates to eyeglass mountings, and particularly to that class in which the lenses are connected by a relatively rigid bridge and the guards or nose-bearing pads are pivoted and actuated toward each other by springs and provided with operating arms or members arranged forward of the lenses by means of which the bearing pads may be separated for the application of the glasses to or their removal from the nose of the wearer.

The invention consists in certain improvements whereby the guards are mounted upon fixed pivots and the springs for operating them while long enough to enable them to be operated easily, are of such nature and so disposed as not to render the mounting unsightly, and further, in certain features of construction and combinations of parts all as will be hereinafter more fully explained, the novel features being pointed out in the claims at the end of the specification.

In the accompanying drawings: Figure 1 is a top plan view of a pair of eyeglasses embodying my improvements. Fig. 2 is a bottom plan view of the same. Fig. 3 is an enlarged bottom plan view of one of the guards shown in Fig. 2. Fig. 4 is a sectional view on the line *x—x* of Fig. 3. Fig. 5 is a sectional view on the line *a—a* of Fig. 1. Fig. 6 is a bottom plan view of a modified form of the invention. Fig. 7 is a sectional view on the line *y—y* of Fig. 6.

Similar reference numerals in the several figures indicate similar parts.

The lenses indicated by 1 are secured at the ends of a support comprising preferably a substantially rigid bridging portion 2 slightly arched to rest upon or in proximity to the bridge of the nose of the wearer, the connection between the support and lenses being formed in the present instance by providing the former with the usual perforated lens-attaching lugs 3 and the vertically-extending bearing lugs 4 engaging the edges of the lenses. The portions of the support between the attaching lugs and the arch or bridging portion constitutes what may be termed the seats for the guards, being flattened for this purpose and provided with suitable vertically - extending pivots, in the form of screws 5 which also form the means of attachment of the guards to the mounting. Adjacent to the reduced, threaded portion of the screw 5 which extends into the support is a shoulder that bears on top of the latter as clearly shown in Fig. 4 to limit the inward movement thereof while the guard arm 8 turns on the projecting portion and is guided in such movement between the head of the screw and the seat offered by the support as above mentioned. I have used the term guard in the present specification to refer to the movable part embodying the nose-bearing pads or portion and the operating member.

In the preferred form of construction shown in Figs. 1 to 5, the guards consist of a body portion extending transversely of and resting upon the bridge end or support and formed of a single piece of sheet metal, the portion in rear of the support being twisted slightly and bent downwardly, and then upwardly and rearwardly, forming the lower nose-bearing pad or loop 6 and the upper bearing pad 7. From the pivot the guard extends forwardly, constituting the operating arm 8, and rearwardly again forming the arm 9 substantially parallel with the arm 8. Arranged beneath the pivot of the guard is the operating spring preferably formed of a flat spiral coil of spring material, substantially in line with the pivot pin, the inner end of the coil being connected to the end of the arm 9, and the outer end 12 extended in rear of the lens and connected to the rear face of the latter, preferably by extending over on one of the lens-attaching lugs 3 and having its end perforated to form an eye so that it may be secured by the screw 10 which fastens the lens to the mounting.

In the embodiment shown in Figs. 1 to 5 inclusive, the coil spring indicated by 11 is formed integrally with the guard as a whole, the metal at the inner end of the arm 9 being bent or formed to proceed laterally, edgewise of the material, and thence upwardly, flatwise of the material, from which point it merges into the inner convolution of the coil, as shown at 13 in Fig. 4 in order that this may be accomplished, and this one piece construction I prefer. However, substantially the same result is accomplished by making the coil spring and its attaching arm 12 separate from the guard and turning up small parallel flanges 14 from the sides of the inner end of the arm 9 so as to form an eye or box that will receive and embrace the inner end of the coil as shown in Figs. 6 and 7, this construction enabling the guard and its operating portion to be made of one kind of metal and the spring of more resilient metal, as will be understood.

The feature of providing a winding coil spring for turning the guard on its pivot is advantageous, in that a relatively long spring giving an easy and practically uniform movement is provided, and furthermore by locating the spring underneath the support and substantially in line with the pivot of the guard, its diameter may be increased within reasonable limits without interference with other parts of the mounting, or detracting from the appearance of the device as a whole.

It will be obvious that the shape of the guard as a whole, or of the bearing pads, may be varied, without departing from my invention, and I do not, therefore, desire to be confined to precisely the construction shown.

The provision, in the pivoting movement of the guard on the one hand and its supporting structure on the other, of a relatively stationary element on one of the parts on each side of which a bearing is supplied by the other, such for instance as the seat on the bridge and the shoulder presented by the head of the pivot, arranged respectively on opposite sides of the guard and of its intended plane of movement, is advantageous whether or not the spring is located below the bridge, or, in other words, whether or not the latter is arranged between the spring and the guard, as shown in the present embodiment, because the guard is thus confined definitely to its plane of movement and is prevented from wabbling or rocking transversely thereof, while at the same time its pivot can be used for supporting the spring centrally and symmetrically with respect to the movement of the guard and at an outside or accessible point. But when the spring is so located, I am enabled to utilize both sides of the support or bridge and provide a convenient stationary bearing surface adjacent the spring as well as the guard, and in some forms, as for instance that shown in Figs. 6 and 7, either the spring or guard can be removed independently of the other. With the parts thus arranged it is, of course, necessary to provide a connection or part extending transversely through the horizontal plane of the support or bridge, and this in the present form is formed by the loop or bend at the forward end of the guard levers. This construction enables me to bring the guide for the opposite side of the guard, formed by the head of the screw, in the present instance, close to the bridge, providing a short bearing and also to bring an extension or projection from one of the above mentioned confining abutments of the guard in line with the pivotal axis of the latter (formed, in the construction shown, by the lower projecting end of the screw 5) to a location at which it centers the spring coiled around it at a point where plenty of room is afforded for its accommodation and manipulation.

I claim as my invention:

1. In an eyeglass mounting, the combination with a support, of a guard pivoted on one side of the support and extending in front and rear thereof, the rear portion of said guard having a bearing pad thereon and the forward portion constituting an operating arm, and a flat spiral spring located on the side of the support opposite the guard substantially in line with the pivot and having one end connected to the support and the other to the guard.

2. In an eyeglass mounting, the combination with the support, of a guard pivoted on the upper side of the support and extending in front and rear thereof, the front portion constituting an operating arm and the rear portion having a bearing pad thereon, and a flat spiral spring arranged beneath the support and substantially in line with the pivot and having one end connected to the guard and the other connected to the support.

3. In an eyeglass mounting, the combination with the support, of a guard pivoted on one side of the support and extending in front and rear thereof, the rear portion having a bearing pad thereon and the front portion having an operating arm, and an arm extending from said operating arm on the side of the support opposite the guard, and a spring connected to the end of the last mentioned arm and to the support.

4. In an eyeglass mounting, the combination with a support, of a guard pivoted on one side thereof and having the rearwardly-extending portion provided with a nose-bearing pad and a forwardly-extending operating portion, an arm being extended from the guard and lying on the opposite side of the support, and a coil spring connected to the arm and to the support.

5. In an eyeglass mounting, the combination with a support, of a guard pivoted to said support and extending in front and in rear thereof, and an independent connection between the guard and the support comprising an arm extending rearwardly from the forwardly extending portion and a coil spring arranged substantially in line with the pivotal center of the guard.

6. In an eyeglass mounting, the combination with the support, of a nose guard pivoted thereon and having a bearing pad in rear of the pivot and an operating arm in front thereof, a rearwardly-extending arm, a coil spring substantially in line with the pivot forming a continuation of the last mentioned arm and having its free end extending outwardly therefrom and means for connecting the latter to the support.

7. As an article of manufacture, a nose guard having at one end a nose-bearing pad and at the other two parallel arms connected at their outer ends, and a coil spring arranged at the inner end of one of the arms and having an arm extending outwardly therefrom.

8. As an article of manufacture, a nose guard comprising a lever formed from flat stock and having a finger piece at its forward end; a nose engaging member carried by the rear end of the lever, a flat spiral spring for the guard arranged about a vertical axis and formed from flat stock integral with and below the lever, and an arm extending from the spring for coöperation with the mounting.

9. In an eyeglass, the combination with the support for the lenses, of the guards pivoted on the support and extending transversely thereof, the forward ends of the guards serving as operating portions and the rear ends provided with bearing pads, flat spiral springs arranged substantially in line with the pivots and each connected at one end to the guard, and the other extending over the faces of the lenses and means for securing said ends to the lenses.

10. In an eyeglass mounting, a support, a guard pivoted to the support and comprising a rearwardly-extending portion with a nose bearing pad and a forwardly extending portion constituting the operating arm and having an arm connected to its outer end and extending rearwardly substantially parallel thereto, and a coil spring arranged between the inner end of the operating arm and the rearwardly extending arm.

11. In an eyeglass mounting, a support and a guard pivoted to the support to project rearwardly and forwardly therefrom, and an arm extending from the guard and having a coil spring forming a continuation thereof, arranged in a line with the pivotal center and coöperating with the support.

12. In an eyeglass mounting, the combination with a support, of a guard pivoted on one side of the support and extending in front and rear thereof, the rear portion having a bearing pad and the forward portion constituting an operating arm, and a coil spring connected at one end to the guard for positioning the latter and located on the side of the support opposite the guard.

13. In an eyeglass mounting, the combination with a support, of a guard pivoted on the upper side of the support and extending in front and in rear thereof, the rear portion of the guard having a bearing pad thereon and the forward portion constituting an operating arm, and a coil spring located on the under side of the support and connected to the guard for positioning the latter.

14. In an eyeglass mounting, the combination with a support, of a flat spiral spring located on one side of the support and having its outer end secured thereto, and a guard pivoted on the side of the support opposite the spring, connected to the inner end of the latter, and having its pivotal center substantially in line with the axis thereof.

15. In an eyeglass mounting, the combination with a support, of a coil spring arranged on one side of the support, and a guard positioned by the spring arranged on the other side of the support and having a connection extending to and secured to the coil spring.

16. The combination with a support for the lenses, and a removable nose guard pivoted thereon, of a coil spring on the opposite side of the support having its axis coincident with the turning axis of the guard, permanently secured to one of said parts and detachably secured at its other end, permitting the spring to remain with one of said parts on the separation of the guard and the support.

17. The combination with a support for the lenses, and a removable nose guard pivoted thereon, of a coil spring on the opposite side of the support having its axis coincident with the turning axis of the guard, formed integral with the guard to be removed therewith and detachably secured at its other end.

18. In an eyeglass mounting, the combination with a support, a nose guard and coöperating pivot bearings on said parts permitting the guard to swing on one side of the support substantially in a horizontal plane, of a coil spring arranged on the other side of the support with its axis coincident with the turning axis of the nose guard and having one end secured to said guard to be removed therewith, and its other end provided with an arm for coöperation with the support.

19. The combination with a support and a nose guard, of a fastener for securing the guard to the support also serving as a pivot for the latter, and a coil spring surrounding the fastener and having an end coöperating with the support and the other end permanently secured to the guard so that the spring may be removed with said guard.

20. The combination with a support for the lenses, and a removable nose guard embodying a lever pivoted on one side of the support and carrying the nose engaging portion, of a coil spring having its axis coincident with that of the guard and arranged on that side of the lever on which the support is located.

21. The combination with a support having a pivot rigidly secured thereto and provided with a head at its outer end, of a guard embodying a lever turning on the pivot and contacting with the head, and a coil spring having its axis coincident with the axis of the pivot and arranged on the same side of the lever as the support.

22. The combination with a support for the lenses and a nose guard, of a headed pivot pin detachably secured to one of said parts, extending through the other and having the head thereof contacting with the opposite face of said last mentioned member, and a coil spring arranged with its axis coincident with the axis of the pin and on the same side of the guard as the support.

23. The combination with a support for the lenses and a nose guard turning in contact with one face of the support, of a removable abutment bearing against the opposite face of one of said members, and a coil spring having its axis coincident with the turning axis of the guard and located on the same side of the guard as the support.

24. The combination with a support having a seat on one side thereof, of a guard having a pair of parallel arms arranged on opposite sides of the support, one of which turns in engagement with the seat, a coil spring arranged between the arms and a screw fastener surrounded by the spring and holding said arm in engagement with the seat.

25. In an eyeglass mounting, the combination with a support, of a guard pivoted thereon embodying a pair of parallel arms connected in front of the support and lying on opposite sides of the latter, one of said arms extending in rear of the support and carrying both the upper and the lower nose engaging pads, and a coil spring for positioning the guard having its axis coincident with the turning axis of the guard and lying between the arms of said guard.

26. In an eyeglass mounting, the combination with a support having an aperture therein, of a pivotally mounted guard embodying a pair of parallel arms connected on one side of the support and lying above and below the latter, a nose engaging member carried by one of said arms and a removable fastener engaging one of said arms and passing through the aperture in the support to secure the guard to said support, and a coil spring for positioning the guard having its axis coincident with the axis of said guard and lying between the arms of the latter.

27. In an eyeglass mounting, the combination with a support having a seat on one side thereof, of a nose guard embodying an apertured arm turning in engagement with the seat, a second arm connected in front of the support with the apertured arm and lying on the side of the support opposite said apertured arm and a nose engaging member carried by one of said arms, a headed removable fastener passing through the apertured arm having its head engaging said arm to hold the latter upon the seat and extending through the support to the opposite side thereof, and a coil spring surrounding the fastener between the support and the second mentioned arm.

28. In an eyeglass mounting, the combination with a support having a seat on one side thereof, of a headed pivot projecting from the seat, a projection on the opposite side of the support alined with the pivot, a nose guard turning on the pivot in engagement with the seat and the head, and a coil spring for positioning the guard surrounding the projection on the opposite side of the support.

29. In an eyeglass mounting, the combination with a support for the lenses, of a fastener having a screw threaded portion engaging the support, a pivot portion extending from one side of the support and a projecting portion on the other side of the support, of a nose guard turning on the pivot portion, and a coil spring for positioning the guard surrounding the projecting portion.

30. In an eyeglass mounting, the combination with a support for the lenses having a bearing and a pivoted guard lever turning on said bearing, of a coil spring for positioning the guard wound in a flat spiral about the axis of the latter, the outer end being arranged to act against the support and the inner end to act against the guard at a point removed from its bearing.

31. In an eyeglass mounting, the combination with a support having a seat thereon, a pivoted guard turning with one side against the seat and a member engaging the other side of the guard to hold it against the seat, of a projection extending in the direction of the axis of the guard and lying to one side of both the guard and support and a spring for positioning the guard coiled about such projection.

32. In eyeglasses, the combination with a support and a nose guard mounted to swing on one side of the support substantially in a horizontal plane, of a coil spring arranged on the opposite side of the support with its axis coincident with the turning axis of the guard, carried by the guard and cooperating with the support.

33. As an article of manufacture, a nose guard for eyeglasses comprising a guard lever having a finger portion, nose engaging portion and an intermediate bearing portion and a positioning spring forming a continuation of said lever coiled in a flat spiral in axial alinement with the bearing portion and provided with a part adapted to coöperate with the guard support, said part being extended from the outer convolution of the spring.

34. In an eyeglass mounting, the combination with a support, of a guard pivoted on one side of the support to extend forwardly and rearwardly thereof, a coil spring located on the opposite side of the support from the guard and an arm proceeding from the latter transversely through the horizontal plane of the support to coöperate with the spring.

35. In an eyeglass mounting, the combination with a support, of a guard pivoted on one side of the support to extend forwardly and rearwardly thereof, a spring composed of a flat strip of material wound in a flat spiral on the opposite side of the support from the guard and an arm proceeding from the latter through the horizontal plane of the support and coöperating with the spring in the plane of the coil thereof.

36. In an eyeglass mounting, the combination with a support, of a guard pivoted on one side of the support to extend forwardly and rearwardly thereof, a coil spring located on the opposite side of the support from the guard and an arm proceeding from one of said parts through the horizontal plane of the support to coöperate with the other.

37. In an eyeglass mounting, the combination with a support having a seat on one side thereof, and a guard turning on the seat, of a pivot member for the guard projecting beyond the opposite face of the support from that on which the seat is arranged, and a spring coiled about such projecting portion and means for holding the guard against its seat.

38. In an eyeglass mounting, the combination with a support having a seat on one side thereof, and a guard turning on the seat, of a pivot member for the guard projecting beyond the opposite face of the support from that on which the seat is arranged, and a spring coiled about such projecting portion.

39. An eyeglass mounting comprising in combination a pivoted guard, a positioning spring therefor and a supporting portion on the mounting arranged between said parts.

40. In an eyeglass mounting, the combination with a support embodying a vertical pivotal projection and a guard turning thereon in a horizontal plane, one of said parts being provided with two spaced bearing surfaces engaging upon opposite sides of the other to prevent axial movement of the guard, of a centering projection extending to one side of the guard and support and arranged in the pivotal axis of the guard and a spring for positioning the latter surrounding said projection.

41. In an eyeglass mounting, the combination with a support, a guard pivoted thereto to operate in a horizontal plane and a centering projection extending axially of the guard and to one side of the guard and support, of a spring for positioning the guard coiled about the projection, and two members each independent of the spring having bearing surfaces respectively engaging opposite sides of the guard to hold it against tilting in a vertical plane.

42. In an eyeglass mounting, the combination with a support and a guard pivoted thereto, of a downwardly extending projection on the support arranged in alinement with the turning axis of the guard and a flat spiral spring for positioning the guard wound about the projection and arranged below both the guard and the support.

43. In an eyeglass mounting, the combination with a support, a guard pivoted thereto to operate in a horizontal plane and a centering projection extending axially of the guard and to one side of the guard and support, of a flat spiral spring for positioning the guard coiled about the projection below the support, and two members each independent of the spring having bearing surfaces respectively engaging opposite sides of the guard lever to hold it against tilting in a vertical plane.

44. In an eyeglass mounting, the combination with a support and a nose guard mounted to swing thereon substantially in a horizontal plane, of a spring for positioning the guard made from flat stock embodying a flat spiral coil arranged with its axis vertical secured at one end to one of the first two named parts and having an arm proceeding from the other end and coöperating with the other part, the arm being connected to the coil by a flatwise bend of the stock.

45. In an eyeglass mounting, the combination with a support, of a finger piece guard pivoted to turn on one side of the support, a flat spiral positioning spring for the guard arranged on the other side of the support and a pivot for the guard extending through the support and within a coil of the spring.

46. In eyeglasses, the combination with a mounting, of a pivot pin having one portion secured in the mounting and having a shoulder bearing against the outer face of the latter and also having a projecting portion beyond the shoulder and a nose guard turning on the projecting portion.

47. In eyeglasses, the combination with a mounting, of a pivot pin having one portion threaded into the mounting and having a shoulder bearing against the outer face of the latter and also having a projecting portion beyond the shoulder and a nose guard turning on the projecting portion.

48. In eyeglasses, the combination with a mounting, of a pivot pin having a reduced portion secured in the mounting and having a shoulder bearing against the outer face of the latter and also having an enlarged portion projecting beyond the shoulder and terminating in a head and a guard turning on the enlarged portion and confined between the head and the mounting.

LEO. F. ADT.

Witnesses:
MICHAEL F. O'CONNOR,
EDWARD MURPHY, 2d.